US 6,601,426 B2

(12) United States Patent
Wegener (10) Patent No.: US 6,601,426 B2
(45) Date of Patent: Aug. 5, 2003

(54) LASER STRETCH-FORMING PROCESSING APPARATUS FOR SHEET METAL

(75) Inventor: Konrad Wegener, Goppingen (DE)

(73) Assignee: Schuler Held Lasertechnik GmbH & Co. KG (DE)

( * ) Notice: Subject to any disclaimer, the term of this patent is extended or adjusted under 35 U.S.C. 154(b) by 0 days.

(21) Appl. No.: 09/941,018

(22) Filed: Aug. 28, 2001

(65) Prior Publication Data

US 2002/0100308 A1 Aug. 1, 2002

(30) Foreign Application Priority Data

Aug. 28, 2000 (DE) .......................................... 10042197

(51) Int. Cl.⁷ .............................................. B21D 25/02
(52) U.S. Cl. .............................. 72/294; 72/296; 72/302; 72/342.94; 219/121.63; 219/121.67; 219/121.73
(58) Field of Search .......................... 72/296, 295, 302, 72/342.94, 294; 219/121.73, 121.25, 121.63, 121.64, 121.13, 121.14, 121.67, 121.83

(56) References Cited

U.S. PATENT DOCUMENTS

| | | | |
|---|---|---|---|
| 3,568,490 A | * | 3/1971 | Bohmann ..................... 72/302 |
| 5,140,129 A | * | 8/1992 | Torii et al. ............. 219/121.78 |
| 5,359,872 A | | 11/1994 | Nashiki |
| 5,592,842 A | * | 1/1997 | Nyrhila ................... 72/342.94 |
| 5,910,183 A | | 6/1999 | Ford et al. |
| 6,090,330 A | * | 7/2000 | Gawa et al. ............. 219/121.7 |

FOREIGN PATENT DOCUMENTS

| | | |
|---|---|---|
| DE | 4228528 A1 | 3/1993 |
| DE | 4345158 A1 | 9/1994 |
| DE | 4425033 C2 | 7/1999 |
| EP | 0928648 A2 | 12/1998 |
| JP | 62-259621 | * 11/1987 |

\* cited by examiner

Primary Examiner—Daniel C. Crane
(74) Attorney, Agent, or Firm—Leydig, Voit & Mayer, Ltd.

(57) ABSTRACT

A processing apparatus is provided which includes a stretch-forming apparatus and a beam processing unit or apparatus, which can be controlled by a common control unit. The beam processing unit can be a laser beam processing unit, which permits a sheet metal piece to be subjected to an additional laser processing step before, during and/or after a stretch-forming process.

13 Claims, 5 Drawing Sheets

LASER STRETCH-FORMING PROCESSING APPARATUS FOR SHEET METAL

FIELD OF THE INVENTION

This invention generally relates to a processing apparatus for sheet metal components produced in short production runs.

BACKGROUND OF THE INVENTION

The production of sheet metal components having complicated shapes in short production runs, such as for the production of relatively large components such as wing components of airplanes or plating of ships, often are performed using a so-called stretch-forming apparatus. This apparatus is designed to pull a plate (sheet metal) across a convex form (tool), so that the metal component is shaped in the desired three-dimensional shape.

Other laser processing units are known, which are used, for example, to cut sheet metal or to weld various components.

In addition, the combination of a mechanical sheet metal processing apparatus with a laser processing unit is known. For example, DE 4425033 C2 discloses an apparatus for pressure shaping sheet metal pieces. The apparatus consists of a die and a pressure roller, which presses the rotating sheet metal onto the die. To facilitate this pressure processing, a laser head is designed to direct a laser onto an area just ahead of the pressure roller. If the sheet metal piece rotates, the laser thus heats the entire circular area of the metal piece to be shaped with the pressure roller. In this manner, the processing step is intended to be performed at a higher processing temperature.

Likewise, in order to facilitate the bending process and to localize the same, a laser source is used as a source of heat in the process and apparatus described in DE 4228528 A1. The apparatus described therein has a platform, which can be moved in two directions, which are respectively equipped with an x and an y direction motor. The platform includes a clamping mechanism for holding the sheet metal. With this arrangement, the sheet metal is clamped in a first location at the edge. The apparatus further includes a multi-jointed arm above the platform that has a clamping unit at its free end. This clamping unit serves to clamp the sheet metal at a location directly opposite the first spot. The multi-jointed arm contains various driving units, so that it can be moved in three dimensions in a controllable manner.

The apparatus also includes a designated spot above the table for a laser head, which is movable in three dimensions and which generates a laser beam movable along a specified path over the sheet metal. This serves to heat linear sections of the sheet metal, so that the bend of the sheet metal concentrates along this area, whenever the clamp held on the arm is moved. In this fashion, sheet metal can be bent in three dimensions without the use of mechanical forms.

The bending apparatus according to DE 4228528 A1 is a special apparatus, which does indeed produce various shaped components without a mechanical die. However, the potential processing steps are limited to bending steps. This limits the applicability of this processing unit.

OBJECTS AND SUMMARY OF THE INVENTION

Accordingly, in view of the foregoing, a general object of the present invention is to provide a processing apparatus for shaping sheet metal which is capable of numerous processing operations.

According to one embodiment, the processing apparatus of the present invention includes at least two clamping mechanisms, which are arranged such that they can clamp the sheet metal at two separate locations. A motor serves to adjust the distance between the clamps in such a way and, if necessary, with such force as to facilitate a stretching of the cold or partially pre-warmed sheet metal. In this way, the sheet metal may be drawn across a die held in a receptacle in order to be simply and quickly formed in the desired shape. In addition, a beam processing apparatus, such as a laser processing unit, is designed to operate on the sheet metal before, during or after the stretching-forming step. A cutting operation is an example of such an operation that can be performed by the beam processing unit. Thus, it is possible, for example, to cut the sheet metal immediately after stretching. For example, the pressure roller may be removed and/or the outer edge may be finished. The integration of this process into the stretch-forming apparatus facilitates economic and flexible processing, even for very short production runs. The gripping jaws (clamps) of the stretch-forming apparatus thus also serve as the tensioning apparatus for the cutting operation performed by the beam processing unit. In addition, the beam processing apparatus can serve to weld reinforcements, such as stringers or ribs, onto the concave or convex side of the sheet metal (i.e. outside or inside). In such a case, the stretch-forming die can be used as a tensioning mechanism, if the reinforcements are welded onto the outside. If the reinforcements are welded onto the inside, they may be seated into notches of the stretch-forming die, where the welding can then be executed as a covered laser weld from the outside. Otherwise, stringer and rib frames may be used as directly forming components that are clamped into an apparatus. The sheet metal is tensioned across these components, where the gap between the elements to be welded is simultaneously reduced.

In addition, it is possible to pre-bend the reinforcements to be welded in the stretch-forming die or in its vicinity and then to weld from the side of the reinforcement. Thus, the beam processing unit may be located either on the convex side of the stretch-forming form, i.e. above the sheet metal, or below it.

The integration of the beam processing unit into the stretch-forming apparatus not only enables the completion of sequential processing steps using one and the same apparatus, thus saving handling and positioning time as well as investment costs for another clamping apparatus, but also allows for the design and execution of processing operations that would be impossible with independent units. For example, a piece of sheet metal may be first stretched and then treated with a laser, such as to apply openings, cut a component and/or weld on additional components. Subsequently, the bending or stretching may continue. Thus, new elements with totally different properties may be produced. It is also possible to target the heating during the stretch-forming process to specific areas of the sheet metal to aid in the shaping process. In this way, it is possible to produce sheet metal components with a higher or reduced thickness in targeted areas.

The beam unit includes a beam head, which focuses the beam onto the work piece. The beam head is at least movable in a targeted manner by way of a positioning mechanism. In the simplest case, the positioning unit is a movable bridge that spans the stretch-forming apparatus. With such an arrangement, the beam head can be focused onto any spot on the work piece. The bridge construction does not obstruct access to the workspace of the stretch-forming apparatus, which, if desired, may be operated also in the conventional way, i.e. without the additional beam processing.

In addition to the beam processing unit, an additional source of heat designed to affect the work area may be included. For example, this additional source of heat may be designed to heat larger areas of the work piece. This could serve to improve the welds to prevent hot breaks or to soften certain parts of the work piece. The source of heat may consist of an induction coil or of several induction coils, which move with the beam head or which have a separate motor. The distribution of heat energy and the temperature at the treatment location may be influenced by a corresponding control unit, if provided. The residual heat from the heat source may also be used by the beam processing unit. The heat source may also serve to pre-heat the work piece prior to welding or molding.

Preferably, the apparatus includes a unified control unit, which controls the actions not only of the stretch-forming apparatus as well as the beam processing unit and, if present, the induction heating unit. The form of the metal piece being worked on is determined by the stretch-forming die (the tool). Its form and quality are also determined by the control program, which controls the stretch speed, pre-warming, cutting processes and welding processes.

In an advantageous embodiment of the invention, the beam processing unit comprises a laser beam processing unit. If needed, this could also be used for cutting. For this purpose, the relevant laser head is preferably also equipped with a cutting gas supply nozzle, which receives cutting gas in a measured manner.

In an alternative design, the laser head serves as the welding head. As an alternative, the laser head may be switchable to various operational modes, so it can handle a welding operation just as well as a cutting operation, or the apparatus has a switchable receptacle for receiving several different heads.

The unified control unit for all components of the processing apparatus enables coordination of the beam processing and the mechanical stretch-forming process, so that the operations need not be run sequentially, but may even be run simultaneously by combining a laser operation with a stretching operation. During a stretching operation, various areas of the sheet metal piece may be heated, cut or welded to shape the metal components in a particular fashion.

These and other features and advantages of the invention will be more readily apparent upon reading the following description of an exemplary embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall with the spirit and scope of the invention.

DETAILED DESCRIPTION OF EXEMPLARY EMBODIMENTS

Figure 1:
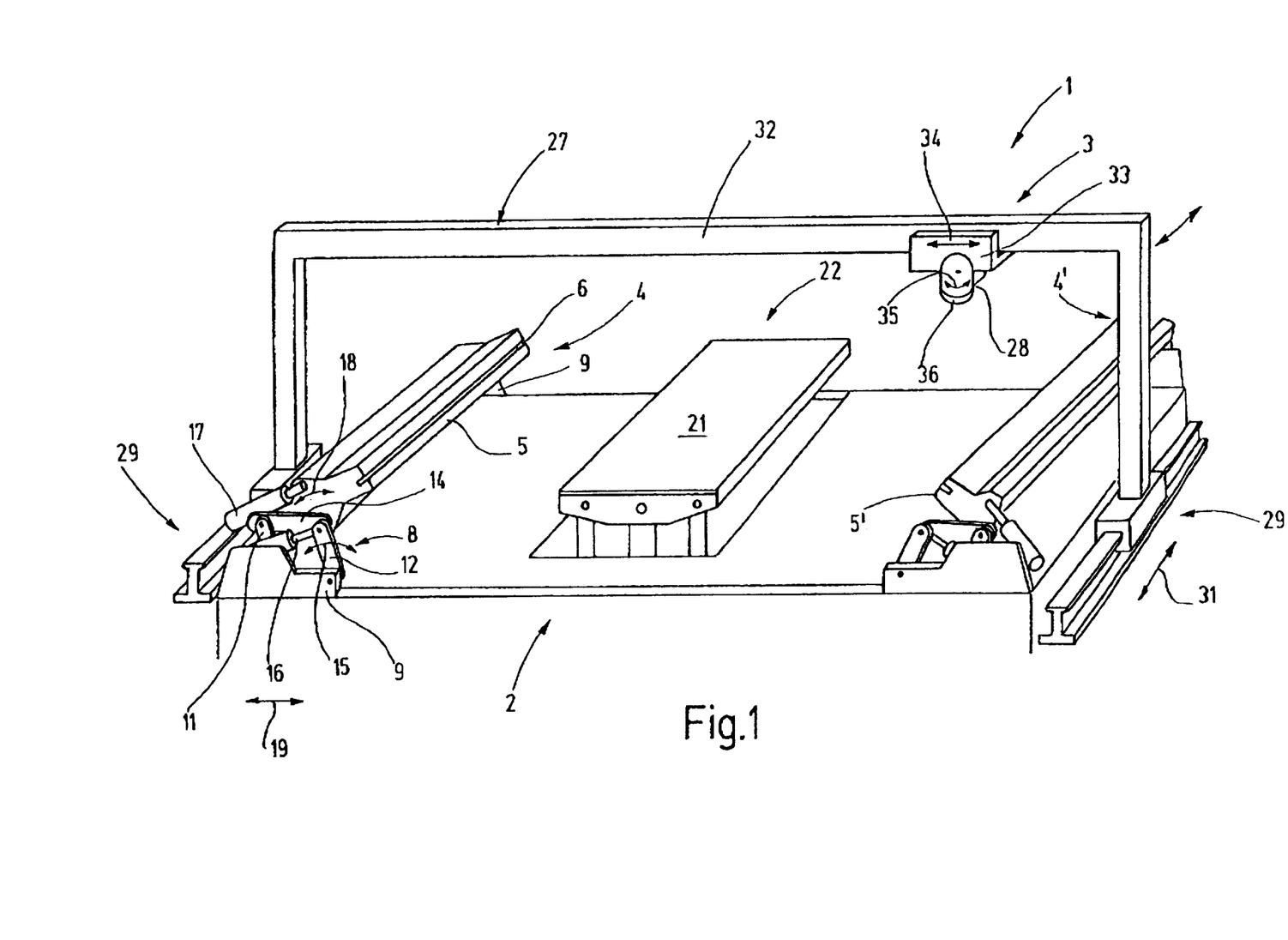
FIG. 1 is a schematic perspective view of an exemplary stretch-forming apparatus equipped with a laser processing unit in accordance with the teachings of the present invention.

Referring now more particularly to the drawings, FIG. 1 shows a processing apparatus 1 according to the present invention, which contains a stretch-forming apparatus 2 and a beam processing unit 3. The stretch-forming apparatus 2 includes a first clamping mechanism 4 having gripping jaws 5 with a slit-like opening 6. The edge of a sheet of metal can be inserted in the opening, and the sheet metal can then be manually clamped and released at will.

A second clamping mechanism 4' is arranged opposite the first clamping mechanism 4, which is structured, housed, operated and powered in an identical fashion as the first clamping mechanism 4. Consequently, the following description applies to both the first and second clamping mechanisms 4 and 4', where the same identification numbers as the first mechanism 4, but with an apostrophe, are used for purposes of presentation of those parts associated with the second clamping mechanism 4'.

The clamping mechanism 4 is connected on both facing sides to a carriage 9 by a flexible parallelogram connection 8. The parallelogram connection 8 includes two linkages 11, 12, which are attached to a carriage 9 and which can be flexed parallel to each other. The upper ends of the linkages 11, 12 are connected by a bridge 14, which flexibly supports the gripping jaw 5. The bridge 14 and thus the gripping jaw 5 can be moved by means of the linkages 11, 12 in the direction indicated by arrow 15 in FIG. 1. A hydraulic cylinder 16, which rests on the carriage 9 and which has a piston connected to either linkage 11 or linkage 12, is an example of a mechanism for powering the movement, i.e. it changes the distance between the two gripping jaws 5, 5' and thus powers the clamping mechanisms 4, 4'. In addition, the bridge 14 carries an additional actuator, such as a hydraulic cylinder 17, which has a piston connected to the gripping jaw 5, and which can thus move the same, as indicated by arrow 18.

Moreover, the carriage 9 can be supported in such a way that it is linearly adjustable and is connected to an appropriate actuating mechanism. The associated direction of adjustment is indicated by arrow 19 in FIG. 1.

A table 21, which contains a receptacle for the piece to be worked on, is shown in FIG. 1. This table 21, including thus also the die thereon, is located in a workspace 22, which is interior to the gripping jaws 5, 5'. The table 21 is connected to a actuating mechanism 23, which is not shown separately in FIG. 1, but which can be seen in FIG. 4; this actuating mechanism is, for example located below the table in such a way that it can modify the vertical position of the table. Other actuating or adjustment mechanisms 24, 25, which are located underneath the table 21, may be added. These adjustment mechanisms 24, 25 are designed to grip the edges of the table and serve to adjust the table to any desired angle. This angle may be constant during a stretch-forming process. Other applications are also possible, where the stretch-forming apparatus is moved during the stretching process.

The beam processing unit 3 included in the processing apparatus 1 contains a bridge 27, which spans the workspace 22. The bridge 27 carries a laser head 28. In order to move the laser head into any desired position within the entire workspace 22, the bridge 27 can be adjusted in the directions shown by arrows 15 or 19 by means of perpendicular linear guides 29 on either end of the bridge. This accomplished via appropriate rail guides and controlled by actuating units that are not shown separately. The direction of movement is shown by arrow 31 in FIG. 1, which also symbolizes the driving direction. The bridge 27 also contains a longitudinal member 32, to which a carriage 33 is attached, which can be moved lengthwise along member 32 (arrow 34). The movement is controlled by an actuating unit, which is symbolized by arrow 34. The laser head 28 is attached to the carriage 33 in such a way as to be movable around one axis (the direction of movement is shown by arrow 35). The laser head 28 is equipped at its lower end with the associated processing optics 36, which serve to focus the laser beam produced.

The laser head 28 is a component of a beam processing unit, which includes a laser beam source and a laser control unit that provides the optical connection between the laser beam source and laser head 28. The laser control unit may consist of a mirror adjustment according to the principle of flying optics, light fiber optics or the like.

The processing apparatus 1 described so far operates in the following manner:

Prior to working on the sheet metal, a die W is first fastened to the table 21. The die W is then moved downwards far enough that an imaginary line connecting the two gripping jaws 5, 5' does not intersect the die W. A straight piece of sheet metal (blank) is then clamped in the gripping jaws 5, 5' and tightened. If holes are to be produced in the sheet metal at this point, the laser head 28 is moved to the appropriate starting position and is activated to make the desired cut. The gripping jaws 5, 5' serve to hold the sheet metal in place during this process. If other components are to be welded to the sheet metal, the cutting head is exchanged with an available welding head, the relevant additional components are placed in the desired locations and are welded to the sheet metal by the effect of the laser beam from the laser head 28. Through movement in the direction of arrows 31, 34, 35, the laser head 28 may be placed in any desired position such that the laser beam always impacts on the sheet metal piece vertically from above or, if desired, at an angle tangent to the surface of the sheet metal. Additional components may be welded on the sheet metal piece from above or from below. However, if no laser treatment, i.e. neither a welding process nor a cutting process nor any other heat treatment process, is intended prior to the stretch-forming process itself, the laser head 28 remains inactive and the driving units 16, 17, 23 (FIG. 4) are moved such that the die W is pressed from below against the sheet metal, which itself is firmly held in place and the sheet metal is pulled over the die with the gripping jaws 5, 5'.

If needed, the laser head 28 is activated during this stretch-forming process, so that the laser beam may work on the piece being processed. This may take place either during an ongoing stretch-forming process or during an interruption of the stretch-forming process—as needed. For example, the stretch-forming process may be interrupted briefly to incorporate cuts or the welding of components such as reinforcements, ribs or the like.

If the stretch-forming process is concluded, the laser head 28 may again or, if no laser work had previously been done, initially work on, for example, the edges or other parts of the sheet metal. Also, any additional components may be welded on the piece of sheet metal, if needed.

The illustrated processing apparatus 1 allows the design of processing steps that were heretofore not possible in a stretch-forming apparatus. In addition to the stretch-forming processes, other processes may be carried out prior to, during, or after the stretch-forming process. In such a case, the piece being processed (sheet metal) may not only be shaped as before into single or multiple bends, but cutting or welding processes may be undertaken and the dimensional transformation of the sheet metal in segments may be aided by heat treatment. If needed, several identical or different laser heads, which may move independently, may be included. These may be located above the workspace 22 on the bridge 27 or outside of the workspace 22. The arrangement above the workspace, i.e. on the convex side of the die W, has the advantage that the sheet metal is not covered by the die and thus the entire workpiece (the sheet metal) is accessible.

Figure 2:
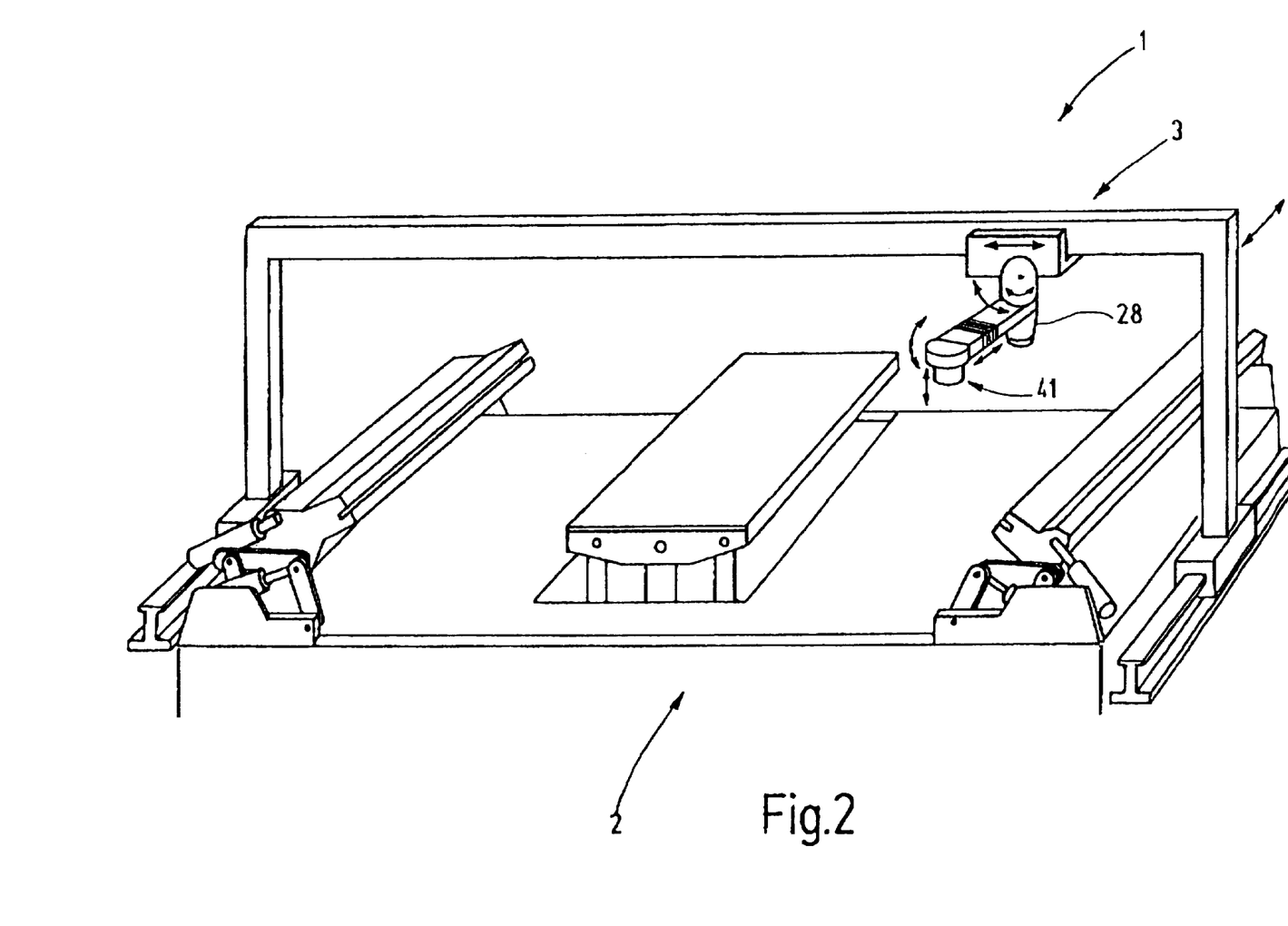
FIG. 2 is a schematic perspective view of an alternative embodiment of a stretch-forming apparatus according to the invention which has a laser processing unit and an induction heating unit.

FIG. 2 depicts an alternative embodiment of a processing apparatus 2 according to the invention. To the extent that the FIG. 2 embodiment is identical to the previously described embodiment, the corresponding previous description is referenced. The beam processing apparatus 3 has basically at least two axes, i.e. directions of movement, for the laser head 28. The previously described embodiment also included the rotation axis 35. In the embodiment of FIG. 2, a second heat treatment unit 41 is included, in addition to the laser head 28, and it is intended to treat the die not primarily by localized heat treatment, but rather by wide-area heat treatment. The heat treatment unit 41 is formed in the illustrated embodiment by an induction head, which is supported in such a way as to be radially and axially adjustable with respect to the laser head 28. In addition, it may be designed to be infinitely movable. Thus, the heat treatment unit 41 may be moved ahead of or trailing the laser beam, for example, to retemper previous welds or to pre-warm spots to be welded. In addition, the sheet metal may be partially hardened, if the beam processing unit includes a feature capable of emitting a stream of cooling liquids. In that case, an area heated by the induction head 41 may be quenched, for example, in order to achieve a tempering.

Figure 3:
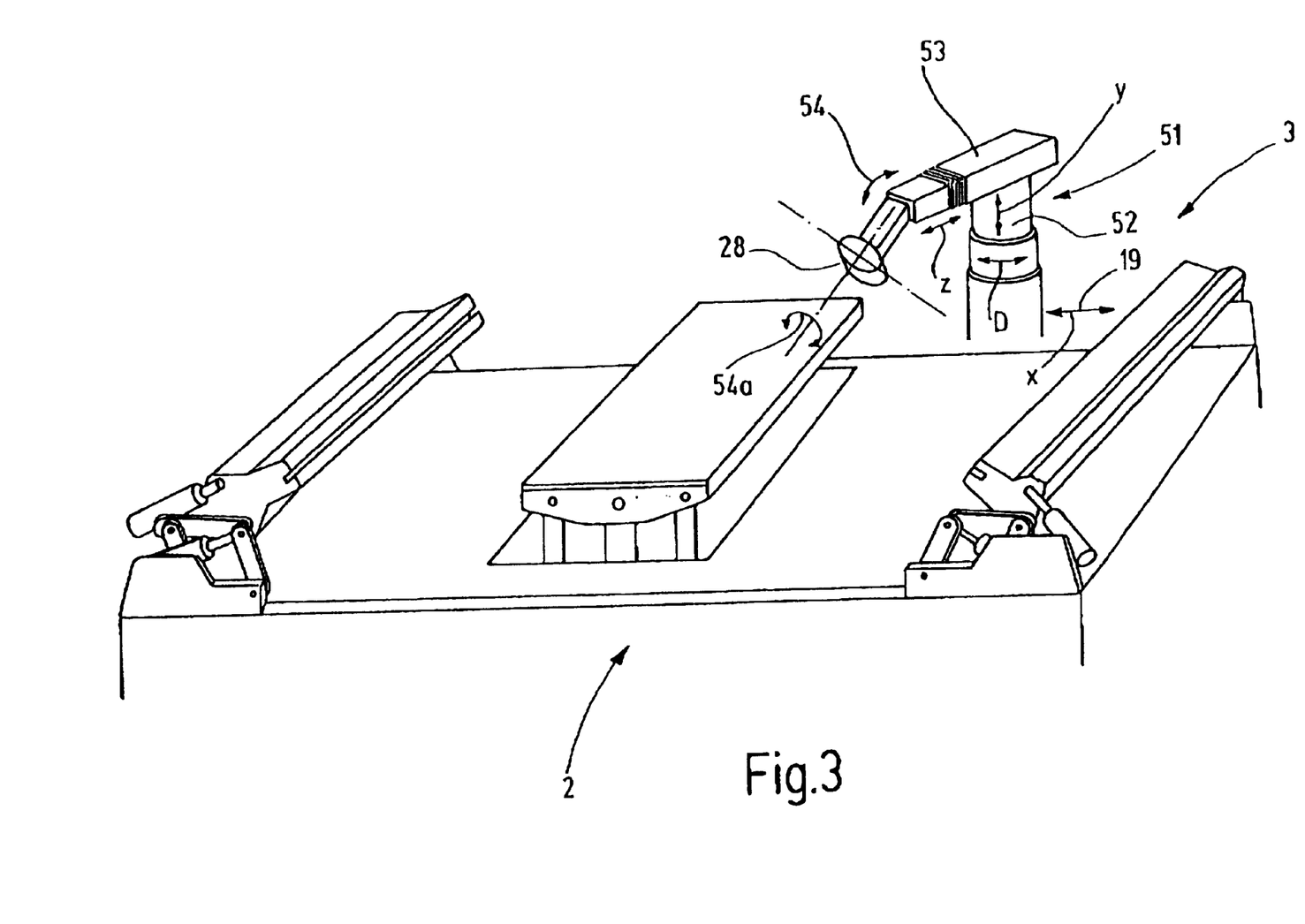
FIG. 3 is a schematic perspective view of an alternative embodiment of a stretch-forming apparatus with a beam processing unit.

A further modified embodiment of the processing apparatus 1 of the invention is shown in FIG. 3. Whereas the stretch-forming apparatus 2 is identical to the embodiments according to FIG. 1 and 2, the laser head 28 of the beam processing unit 3 in the FIG. 3 embodiment is supported by a positioning mechanism 51 similar to an industrial robot. This includes a column 52 with corresponding actuators such that it rotates around a vertical axis and telescopes vertically. The column 52, which is either stationary or which may be moved controllably in the direction of arrow 19, supports a telescoping cross member 53 on its upper end, which is preferably perpendicular to the radial direction. On its free end, the cross member 53 supports the laser head 28, which preferably can rotate around each of axes 54 and 54a as well as being adjustable in directions x, y, z and/or which rotates around the vertical axis D. Both rotation axes 54, 54a are preferably arranged at a right angle to each other and to the beam direction S. Even though the axes 54, 54a are not required to intersect the center axis of the laser head 28 (beam direction S), this is advantageous for the positioning of the laser head 28. This beam processing apparatus 3 is particularly suitable for simply and effectively processing sheet metal with complicated contours prior to, during and after the stretch-forming process.

Figure 4:
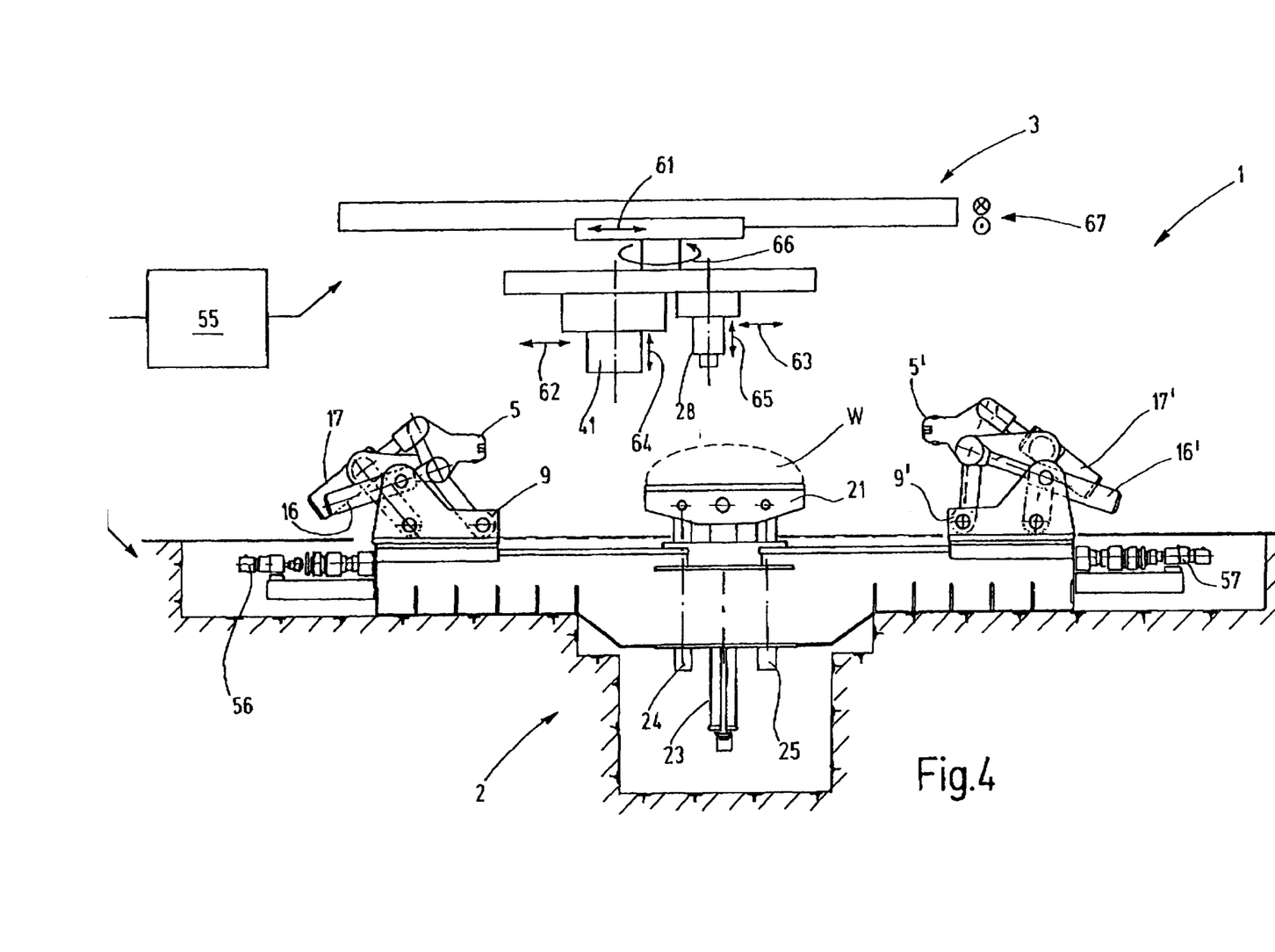
FIG. 4 is a schematic perspective view of a further embodiment of a stretch-forming apparatus combined with a laser processing unit and an induction heating unit.

FIG. 4 depicts an additional embodiment of the processing apparatus 1 of the invention. In this embodiment, a central processing apparatus 55 is designed to control all the driving and positioning units of stretch-forming apparatus 2 and the beam processing apparatus 3. Arrows in the figures basically identify the driving and positioning units by means of showing their controlled direction of movement. The driving units of the stretch-forming apparatus include motors 16, 17, 16', 17', 23. 24, 25 and possibly motors 56, 57 for carriages 9, 9'. In addition, the opening and closing of gripping jaws 5, 5' can be controlled. The beam processing apparatus 3 includes motors, which are merely identified in FIG. 4 by arrows showing their working or effective direction. These motors include motor 61, which moves a unit consisting of the laser head 28 and the induction head 41, motor 62 for horizontal movements of the induction head 41, motor 63, which likewise controls the horizontal movement of the laser head 28, motors 64, 65 for vertical movements of the induction head 41 and the laser head 28, as well as motor 66, which rotates the unit consisting of the laser head 28 and the induction head 41 around a vertical axis. Finally, these motors include a motor 67, which keeps the movement of motor 61 at a horizontal right angle to the direction of movement induced by motor 61.

Figure 5:
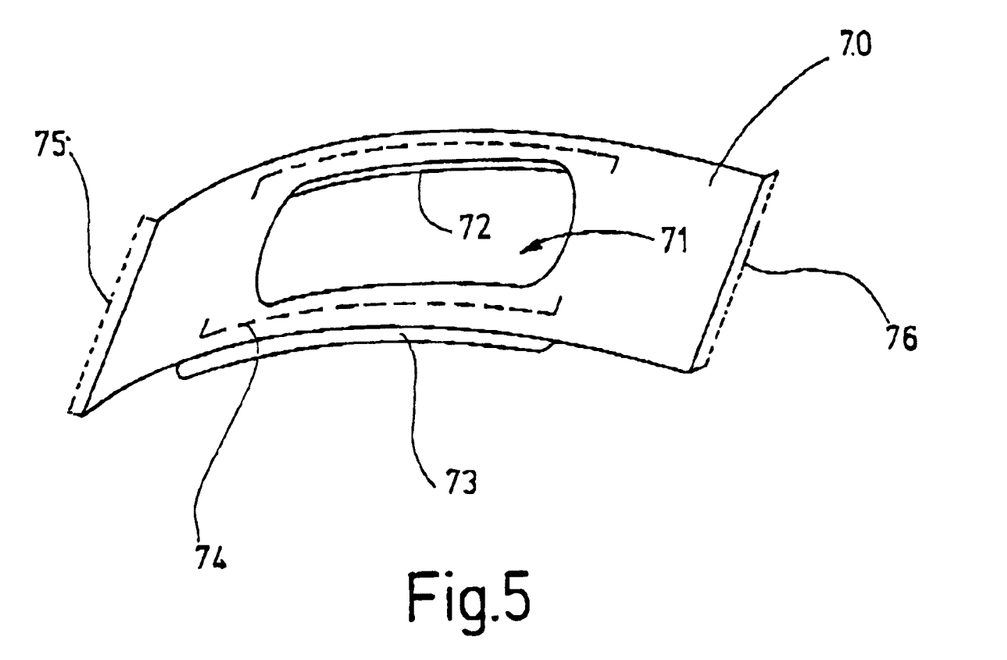
FIG. 5 is a schematic perspective drawing of a sheet metal piece processed by one of the stretch-forming units shown in FIGS. 1 to 4.

FIG. 5 is a simple sheet metal piece, which results from the actions of the stretch-forming apparatus according to FIGS. 1 to 4. The sheet metal piece 70 has been bent simply by the stretch-forming process. Laser head 28 has cut out an opening 71, and two ribs 72, 73 have been welded on both sides of the opening 71. The corresponding welds are indicated at 74. As a final step, the edges 75, 76, which are shown in FIG. 5 merely as dashed lines, are cut off with the laser beam of the laser head 28, whereupon the sheet metal piece 70 was completed and was removed from the processing unit 1.

A processing apparatus 1 contains a stretch-forming apparatus 2 and a beam processing apparatus 3, which are controlled by a common control unit 55. The beam processing apparatus is preferably a laser beam processing apparatus, which makes it possible to subject a sheet metal piece to an additional laser processing step before, during and/or after a stretch-forming process.

What is claimed is:

1. A processing apparatus for bending a piece of sheet metal comprising:
    a first manually operated clamping mechanism to hold a first edge of a piece of sheet metal,
    a second manually operated clamping mechanism to hold a second edge of a piece of sheet metal, which is opposite to the first edge, wherein a workspace is defined between the first and second clamping mechanisms,
    a clamp drive mechanism for selectively modifying the distance between the first and second clamping mechanisms for stretching of the piece of sheet metal,
    a receptacle arranged between the clamping units for holding a shaping tool across which the piece of sheet metal is to be stretched in a stretch-forming process,
    a laser cutting device for cutting the piece of sheet metal held between the clamping mechanisms with a laser beam, and
    a positioning mechanism for selectively positioning the laser cutting device relative to the piece of sheet metal held between the clamping mechanisms.

2. The processing apparatus according to claim 1, further including a heat source which radiates heat into the workspace.

3. The processing apparatus according to claim 2, the heat source comprises an induction heating unit.

4. The processing apparatus according to claim 2, wherein the heat source is carried by a heat source positioning mechanism for selectively moving the heat source within the workspace.

5. The processing apparatus according to claim 1, wherein said laser cutting device is part of a processing unit that further is operable in a welding mode.

6. The processing apparatus according to claim 1, further including a control unit for controlling the clamp drive mechanism and the laser cutting device positioning mechanism in a coordinated manner.

7. A processing apparatus for bending a piece of sheet metal comprising:
    a first manually operated clamping mechanism to hold a first edge of a piece of sheet metal,
    a second manually operated clamping mechanism to hold a second edge of a piece of sheet metal, which is opposite to the first edge, wherein a workspace is defined between the first and second clamping mechanisms,
    a clamp drive mechanism for selectively modifying the distance between the first and second clamping mechanisms for stretching of the piece of sheet metal,
    a receptacle arranged between the clamping units for holding a shaping tool across which the piece of sheet metal is to be stretched in a stretch-forming process,
    a laser welding device for welding a piece of sheet metal held between said clamping mechanism with a laser beam, and
    a laser welding device positioning mechanism for selectively moving the laser welding device relative to a piece of sheet metal held between the clamping mechanisms.

8. A processing apparatus for bending a piece of sheet metal comprising:
    a first manually operated clamping mechanism to hold a first edge of a piece of sheet metal,
    a second manually operated clamping mechanism to hold a second edge of a piece of sheet metal, which is opposite to the first edge, wherein a workspace is defined between the first and second clamping mechanisms,
    a clamp drive mechanism for selectively modifying the distance between the first and second clamping mechanisms for stretching of the piece of sheet metal,
    a receptacle arranged between the clamping units for holding a shaping tool across which the piece of sheet metal is to be stretched in a stretch-forming process,
    a beam processing unit including a beam head for directing a beam into the interior of the workspace,
    a beam head positioning mechanism for selectively moving the beam head of the beam processing unit relative to the workspace,
    a control unit for controlling the clamp drive mechanism and the beam head positioning mechanism in a coordinated manner, and
    a receptacle actuating mechanism for moving the receptacle relative to the first and second clamping mechanisms under the control of the control unit.

9. The processing apparatus according to claim 8, wherein the beam processing unit comprises a laser processing unit.

10. The processing apparatus according to claim 8, wherein the beam processing unit includes a focusing mechanism for focusing the beam onto a focus point on the sheet metal piece being processed.

11. A method for bending a piece of sheet metal comprising the steps of:

clamping opposing edges of the piece of sheet metal in first and second clamping mechanisms of a stretch-forming apparatus, a workspace being defined between the first and second clamping mechanisms, stretching the piece of sheet metal across a shaping tool held by a receptacle arranged between the first and second clamping mechanisms, modifying the distance between the first and second clamping mechanisms as the piece of sheet metal is stretched across the shaping tool, and processing the sheet metal held in the first and second clamping mechanisms with a laser beam produced by a beam tool that is supported by a beam tool positioning apparatus that selectively moves the beam tool relative to the workspace, wherein the step of processing the sheet metal with the laser beam occurs either before, during or after the step of stretching the piece of sheet metal across the shaping tool, and welding a component onto the piece of sheet metal being stretched between said clamping mechanisms.

12. The method according to claim 11, wherein the step of processing the piece of sheet metal with a laser beam takes place while the piece of sheet metal is under tension.

13. The method according to claim 11, further including the step of heat treating the piece of sheet metal during the step of stretching the sheet metal across the shaping tool.

* * * * *